United States Patent
Li et al.

(10) Patent No.: US 8,538,690 B2
(45) Date of Patent: Sep. 17, 2013

(54) VEHICLE TRACKING DETECTION AND ALARM METHOD AND NAVIGATION DEVICE USING THE METHOD

(75) Inventors: Dong-Ming Li, Shanghai (CN); Wei Teng, Shanghai (CN); Chi-Ming Lu, Taipei Hsien (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 12/979,367

(22) Filed: Dec. 28, 2010

(65) Prior Publication Data

US 2012/0143494 A1   Jun. 7, 2012

(30) Foreign Application Priority Data

Dec. 3, 2010   (CN) .......................... 2010 1 0571522

(51) Int. Cl.
G01C 21/26 (2006.01)
G01C 21/10 (2006.01)
G08B 23/00 (2006.01)
B60K 28/00 (2006.01)

(52) U.S. Cl.
USPC ........... 701/466; 701/408; 701/468; 701/521; 340/439; 340/576; 180/272

(58) Field of Classification Search
USPC .............. 701/1, 41, 408, 466, 468, 521, 519; 340/426.1, 426.19, 438, 439, 576; 180/271, 180/272
See application file for complete search history.

(56) References Cited

U.S. PATENT DOCUMENTS

| 4,463,347 | A * | 7/1984 | Seko et al. ................... 340/576 |
| 5,798,695 | A * | 8/1998 | Metalis et al. ............... 340/576 |
| 5,925,082 | A * | 7/1999 | Shimizu et al. ................ 701/41 |
| 7,663,495 | B2 * | 2/2010 | Haque et al. ................. 340/576 |
| 2005/0206562 | A1 * | 9/2005 | Willson et al. ........... 342/357.07 |
| 2009/0326809 | A1 * | 12/2009 | Colley et al. ................. 701/208 |

* cited by examiner

*Primary Examiner* — Christine Behncke
(74) *Attorney, Agent, or Firm* — Altis Law Group, Inc.

(57) ABSTRACT

A tracking detection and alarm method which is applied to a navigation device use a number of positioning data points retrieved from a navigation module of the navigation device. A number of deflections and a number of average speeds that correspond to the position data points are calculated and generated. A number of maximum deflections are calculated and generated according to the average speeds. When a deflection of a positioning data point is greater than a maximum safe deflection thereof, one is added to a frequency of unsafe driving instances. When the frequency of unsafe driving instances is greater than a preset threshold value, an unsafe driving alarm is activated.

18 Claims, 4 Drawing Sheets

VEHICLE TRACKING DETECTION AND ALARM METHOD AND NAVIGATION DEVICE USING THE METHOD

BACKGROUND

1. Technical Field

The present disclosure relates to an alarm method, and more particularly to a vehicle tracking detection and alarm method and a navigation device using the method.

2. Description of Related Art

For drivers to successfully negotiate turns with their cars, they should be alert and not turn in a radius that is too small, otherwise, their car may slip or overturn.

When a driver is not alert, maybe from being too tired or under the influence of drugs or alcohol, his/her driving may be erratic. Accordingly, some vehicles are equipped with a driving assistance system.

One driving assistance system uses an infrared eyeball scanner, which continuously emits infrared rays to scan the whites of a driver's eyes to determine whether the driver is tired. However, the infrared rays may damage the eyeballs.

Another driving assistance system uses an image identification device, which locates the eyes of the driver using a video and image processing technology and determines whether a driver is tired according to how the driver blinks. However, this system is prone to errors.

Yet another driving assistance system uses a blood-pressure detection device, which uses a driver's blood pressure to determine the driver's fitness for driving. However, the device is inconvenient for drivers to attach to themselves, and due to the variety of reasons blood pressure may be abnormal, errors are common.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An embodiment of a vehicle tracking detection and alarm method of the present disclosure provides a method of alerting a driver of unsafe travel of their vehicle based on offset values of the vehicles current driving track. The present method may be implemented by software modules and applied to a navigation device.

An embodiment of the vehicle tracking detection and alarm method of the present disclosure comprises: reading and analyzing location messages from a Global Positioning System (GPS) module to calculate deflections and average speeds of the vehicle according to GPS data points; and determining whether a vehicle is following a track in a safe manner.

Figure 1:
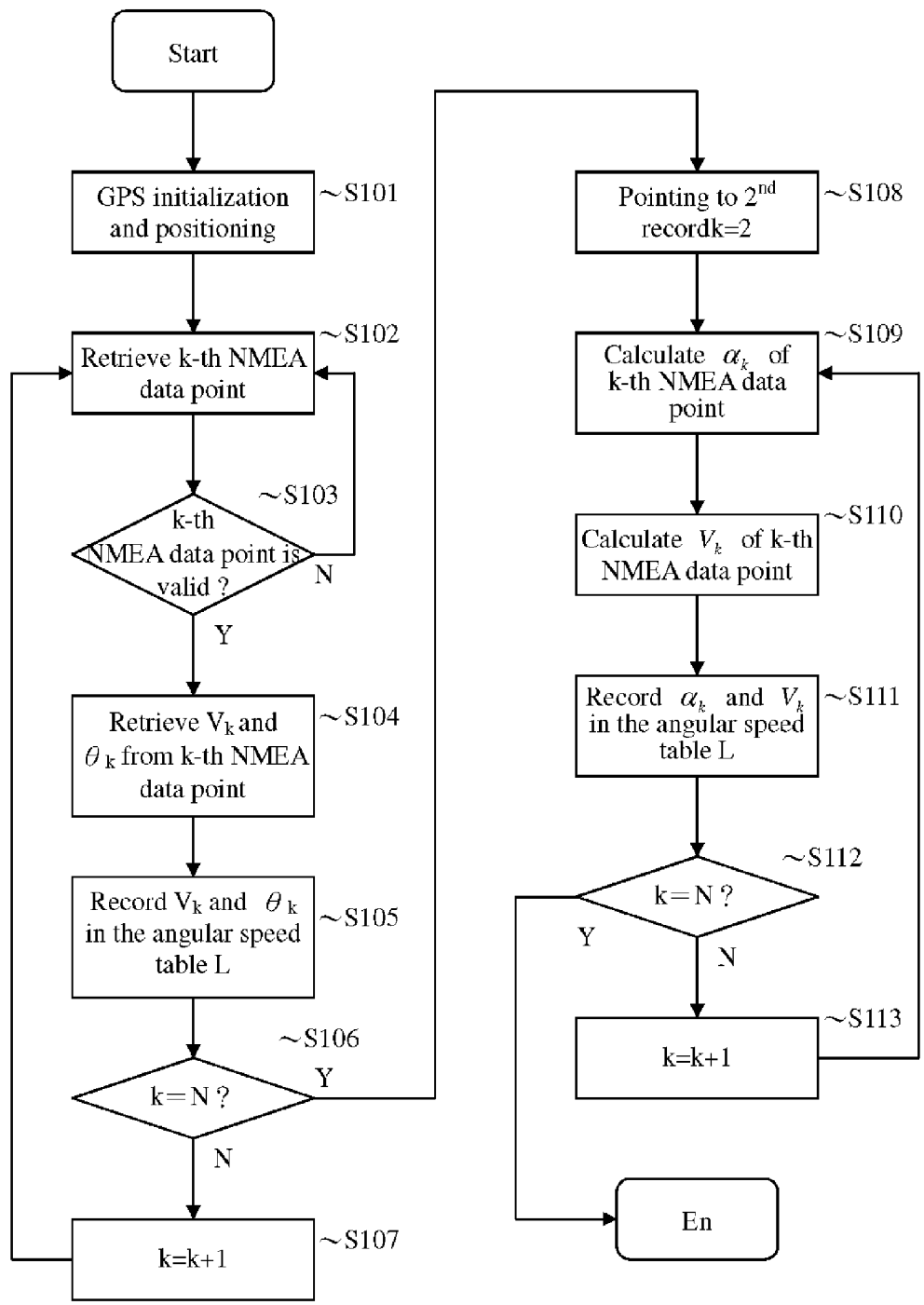
FIG. 1 is a flowchart of one embodiment of a method of calculating deflections and average speeds of a vehicle to generate an angular speed table in accordance with the present disclosure.

FIG. 1 is a flowchart of one embodiment of a method of calculating deflections and average speeds of a moving vehicle to generate an angular speed table in accordance with the present disclosure.

First, a GPS navigation system of a navigation device is activated and initialized, and a positioning operation is performed using a GPS module of the navigation device (step S101). The GPS navigation system may be activated by hot start, cold start or warm start. The GPS navigation system retrieves National Marine Electronics Association (NMEA) data points from the GPS module at fixed time intervals (for example, 1 second) or distance intervals (for example, 100 meters). According to a default setting, N NMEA data points are retrieved at the fixed time intervals or distance intervals.

It is noted that the value of N relates to the speed over ground and road conditions. Accordingly, the GPS navigation system automatically sets the value of N according to the speed over ground and road conditions, and is not further described in the following and is not limited to the present disclosure.

When the k-th NMEA data point is retrieved (step S102), it is analyzed to be determined valid or not (step S103), where k=1, 2, ..., N. In this embodiment, k is initially equal to 1 and indicates pointing to the $1^{st}$ record of an angular speed table L.

In the analyzing step, a Global Position Recommended Minimum Specific (GRPMC) sentence of the k-th NMEA data point is accessed, which comprises 12 fields as shown in Table 1:

TABLE 1

| | |
|---|---|
| <1> | UTC (Coordinated Universal Time) of position fix, hhmmss.sss format |
| <2> | Data status (A = valid, V = invalid) |
| <3> | Current Latitude, ddmm.mmmm format |
| <4> | Latitude Hemisphere, N or S |
| <5> | Current Longitude, dddmmm.mmmm format |
| <6> | Longitude Hemisphere, E or W |
| <7> | Speed over ground, 0.0 to 1851.8 knots |
| <8> | Course over ground, 000.0 to 359.9 degrees |
| <9> | UTC DateStamp, ddmmyy format |
| <10> | Magnetic variation, 000.0 to 180.0 degrees |
| <11> | Degrees, E or W |
| <12> | Checksum |

As shown in Table 1, the accessed NMEA data point is determined to be valid or invalid according to field <2> of the GPRMC sentence.

If the accessed NMEA data point is valid, the speed over ground $V_k$ and the course over ground $\theta_k$ associated with the k-th NMEA data point are retrieved from fields <7> and <8> of the GPRMC sentence (step S104). If the accessed NMEA data point is invalid, the process proceeds to step S12 to retrieve a next NMEA data point. The retrieved speed over ground $V_k$ and course over ground $\theta_k$ associated with the k-th NMEA data point are recorded in the angular speed table L (step S105).

It is determined whether the angular speed table L comprises N NMEA data points (k=N?) (step S106). If the angular speed table L does not comprise N NMEA data points, the value of k is increased by 1 (k=k+1) (step S107) and the next NMEA data point is retrieved for another analysis operation by repeating steps S102~S106, and, thereby, speeds over ground and courses over ground associated with the remaining NMEA data points are recorded in the angular speed table L.

When the angular speed table L comprises N NMEA data points (k=N), the process begins to calculate deflections and average speeds from the $2^{nd}$ to N-th NMEA data points and sets the value of k (k=2, indicating pointing to the $2^{nd}$ record of the angular speed table L) (step S108). Next, a deflection $\alpha_k$ of the k-th NMEA data point is calculated (step S109). The deflection of the k-th NMEA data point is equal to an included angle between the course over ground of the k-th NMEA data point and the course over ground of the (k-1)-th NMEA data point, which is calculated using formula (7) in the following.

An average speed $\overline{V}_k$ associated with the k-th NMEA data point is calculated (step S110). The average speed associated with the k-th NMEA data point is equal to the average value of the speed over ground associated with the k-th NMEA data point and the speed over ground associated with the (k-1)-th NMEA data point. The calculated deflection $\alpha_k$ and average speed $\overline{V}_k$ are listed in the k-th record of the angular speed table L (step S111). It is determined whether calculating operations for all NMEA data points have been completed (k=N?) (step S112).

If calculating operations for all NMEA data points have not been completed, the value of k is increased by 1 (k=k+1) (step S113) so that deflections and average speeds of the remaining NMEA data points are calculated, by repeating steps S109~S111, and recorded in the angular speed table L (N−1 records should be involved in the angular speed table L). When the calculating operations for all NMEA data points have been completed (k=N), the process is terminated, and the method flow of FIG. 2 is then performed.

Figure 2:
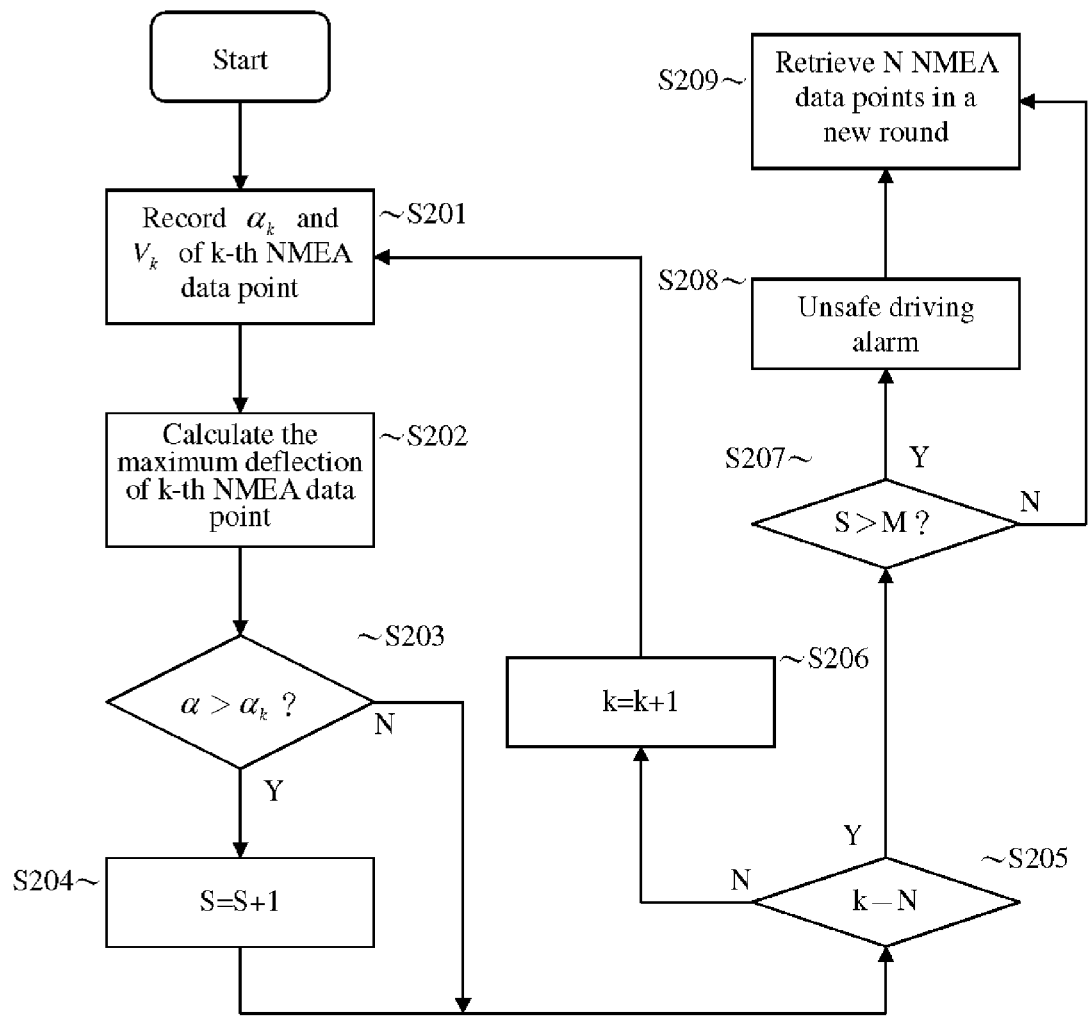
FIG. 2 is a flowchart of one embodiment of a vehicle tracking detection and alarm method in accordance with the present disclosure.

FIG. 2 is a flowchart of one embodiment of a tracking detection and alarm method in accordance with the present disclosure, which determines whether unsafe driving is occurring.

The process has default initial settings of a frequency S of unsafe driving instances as zero and the value of k (e.g. k=2). In this embodiment, k is initially equal to 2 for pointing to the $2^{nd}$ record of the angular speed table L. The deflection $\alpha_k$ and average speed $\overline{V}_k$ associated with the k-th NMEA data point are accessed (step S201) and the maximum deflection thereof is calculated based on the average speed (step S202). It is determined whether the deflection of the k-th NMEA data point is greater than the maximum safe deflection thereof (step S203), and, if so, the frequency of unsafe driving instances is increased by 1 (S=S+1) (step S204).

Regardless of whether the deflection is greater than the maximum safe deflection or not, the process proceeds to the next step and determines whether the calculating operations for all NMEA data points have been completed (k=N?) (step S205). If the calculating operations for all NMEA data points have not been completed, the value of k is increased by 1 (k=k+1) (step S206), and steps S201~S204 are repeated.

When the calculating operations for all NMEA data points have been completed (k=N), it is determined whether the frequency of unsafe driving instance S is greater than a preset threshold value M (S>M?) (step S207). In an embodiment of the present disclosure, the preset threshold value M is set to 3. If the frequency of unsafe driving instances S is greater than the preset threshold value M, an unsafe driving alarm is activated (step S208) to alert the driver.

Whether an unsafe driving alarm has occurred or not too many unsafe driving instances have occurred (S<M), the processing steps shown in FIGS. 1 and 2 are repeated so that the process proceeds with retrieving, analyzing and determining N NMEA data points in a new round (step S209).

The Following Describes a Formula of Calculating a Curve Radius Limit in Light of Technical Standards of Highway Construction According to the Technical Standards of Highway Construction, formula (1) is created based on forces carried by a moving car on a curve, which is represented as:

$$R = \frac{\overline{V}^2}{127 \times (\mu + i)}, \quad (1)$$

where R represents a curve radius (m), $\overline{V}$ represents an average speed of the car (km/h), $\mu$ represents a lateral force, and i represents a lateral gradient. In addition, a preset threshold value represents a lateral friction coefficient.

When a turning radius of a car is less than the preset threshold value, the car may sideslip or overturn. Thus, when a car is moving on a straight away or a curve, if the turning radius of the car is less than the current threshold value then it is determined that an unsafe turning is occurring.

Figure 3:
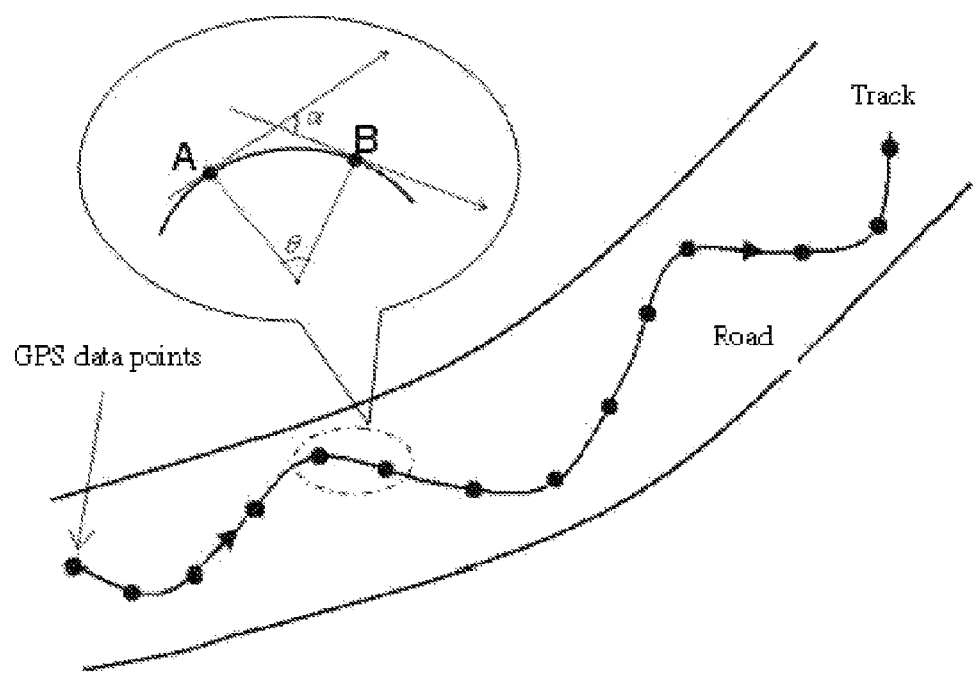
FIG. 3 is a schematic view of a track of a moving vehicle.

The Following Describes Whether a Turning is Safe According to Retrieved GPs Data FIG. 3 illustrates a track traveled by a car, with an analysis point (indicating GPS data points (i.e. NMEA data points)) marked at fixed time intervals (1 second). In view of any two successive GPS data points that illustrate a track, the track must be winding if a course over ground of the car changes, which indicates that the car turns. Therefore, it can be determined whether the turning is safe or not by analyzing the curves of the track.

In terms of analysis data, a track of a center of gravity of a moving car comprises the following geometric features: (1) the curve is continuous and smooth; (2) the curvature is continuous without two curvature values for a GPS data point; and (3) the curvature variation is continuous without two curvature variation values for a GPS data point.

Within a short distance, a track of a moving car may be regarded as occurring on a plane and being composed of straight lines, circular curves, and curves. A transition curve is defined as "a curve with continuous curvature variations" and resides between a straight line and a circular curve or between two circular curves with identical change directions and different radius where one is much greater than the other. Within a short distance, a curve degree of a track of a moving car is calculated by analyzing a curve degree of a circular curve of a track curve.

Between two GPS data points (indicating a car moves for 1 second, for example), it can be assumed that the track is an arc with a uniform radius due to inertia.

In view of geometric mathematics, a curve formula of a circular curve can be represented as:

$$l = \frac{\theta \times \pi \times r}{180}, \quad (2)$$

where $\theta$ represents a central angle (degree) and r represents a radius (m).

In accordance with formula (2), a radius formula can be generated based on a known arc length, which is represented as:

$$r = \frac{l \times 180}{\theta \times \pi}. \quad (3)$$

An arc length is represented by $\overline{V} \times 1s$ within a running time equal to 1 second, where $\overline{V}$ represents an average of speeds over ground retrieved from two neighboring GPS data points. The arc length is brought to formula (3) to create the following formula:

$$r = \frac{\overline{V} \times 180}{\theta \times \pi}. \quad (4)$$

In geometry, a central angle of an arc AB is θ. An included angle of a tangential direction of A and B points on the arc is α and, therefore, θ=α is obtained. Thus, formula (4) can be rewritten as:

$$r = \frac{\overline{V} \times 180}{\alpha \times \pi}, \quad (5)$$

where α represents an included angle of courses over ground retrieved from two neighboring GPS data points.

When a car is turning, if r<R, the car may skid or overturn. Therefore, the following formula can be created:

$$\frac{\overline{V} \times 180}{\alpha \times \pi} < \frac{\overline{V}^2}{127 \times (\mu + i)} \rightarrow \alpha > \frac{127 \times (\mu + i) \times 180}{\overline{V} \times \pi}. \quad (6)$$

As described, if an included angle (α) of courses over ground retrieved from two neighboring GPS data points meets the formula of $$\alpha > \frac{127 \times (\mu + i) \times 180}{\overline{V} \times \pi},$$

a turning of a car is determined as an unsafe turning.

The Following Describes Numerical Analysis for Lateral Force Coefficients (μ) and Lateral Gradients (i)

In light of the Technical Standards of Highway Construction, values of the lateral force coefficient (μ) and the lateral gradient (i) shown in formula (1) is defined by requirements.

Requirement 1: Limited Minimum Radius

A limited minimum radius is an allowed threshold value for highway designs of different highway classes. Values of the lateral force coefficient (μ) and the lateral gradient (i) for the limited minimum radius is set in Table 2:

TABLE 2

| | Speed over ground (km/h) | | | | | | |
|---|---|---|---|---|---|---|---|
| | 120 | 100 | 80 | 60 | 40 | 30 | 20 |
| μ | 0.10 | 0.11 | 0.12 | 0.13 | 0.14 | 0.15 | 0.16 |
| i (%) | 8 | 8 | 8 | 8 | 8 | 8 | 8 |

Requirement 2: Minimum Radius of Curve

The Technical Standards of Highway Construction further defines a minimum radius curve. Values of the lateral force coefficient (μ) and the lateral gradient (i) for the minimum radius curve is set in Table 3:

TABLE 3

| | Speed over ground (km/h) | | | | | | |
|---|---|---|---|---|---|---|---|
| | 120 | 100 | 80 | 60 | 40 | 30 | 20 |
| μ | 0.05 | 0.05 | 0.06 | 0.06 | 0.06 | 0.05 | 0.05 |
| i (%) | 6 | 6 | 7 | 8 | 7 | 6 | 6 |

Requirement 3: Minimum Radius of Circular Curve for a Curve without Bank Design

When a radius of a curve is greater than a predetermined value, even driving on the outside of the curve can be safe. Under this circumstance, an ultrahigh level for a road surface of the curve is not defined, while road humps are designed as two-way lateral gradients. Further, the lateral gradient for road humps of class 2 (or above class 2) highways are set as i=−0.02~−0.01. The lateral gradient for road humps of below class 2 highways are set as i=−0.04~−0.03. Meanwhile, the lateral force coefficient is set as μ=0.035~0.06. In addition, road humps of straight highways are also designed as two-way lateral gradients, where its lateral gradient value is identical to that of a curve without bank design.

The curve design of highway construction generally refers to the above minimum radius of curve and conforms to the lateral force coefficient μ and the lateral gradient i shown in formula (6) according to Table 3 to guarantee the sensitivity of the above processing algorithm.

The Following Describes a Calculation of an Included Angle of Courses Over Ground Retrieved from Two Neighboring GPs Data Points When a car is moving forward, a turning angle within 1 second may be less than 90 degrees. Assume that $\theta_{k-1}$ and $\theta_k$ represent the courses over ground of two neighboring GPS data points, the included angle $\alpha_k$ of the course over ground of the k-th GPS data point is calculated using the following formulas:

$$\alpha_k = \begin{cases} \text{ABS}(\theta_k - \theta_{k-1}) & \text{ABS}(\theta_k - \theta_{k-1}) < 90 \\ \text{ABS}(\text{ABS}(\theta_k - \theta_{k-1}) - 360) & \text{ABS}(\theta_k - \theta_{k-1}) > 90, \end{cases} \quad (7)$$

where ABS represents an absolute value function and k=1, 2, . . . , N.

Figure 4:
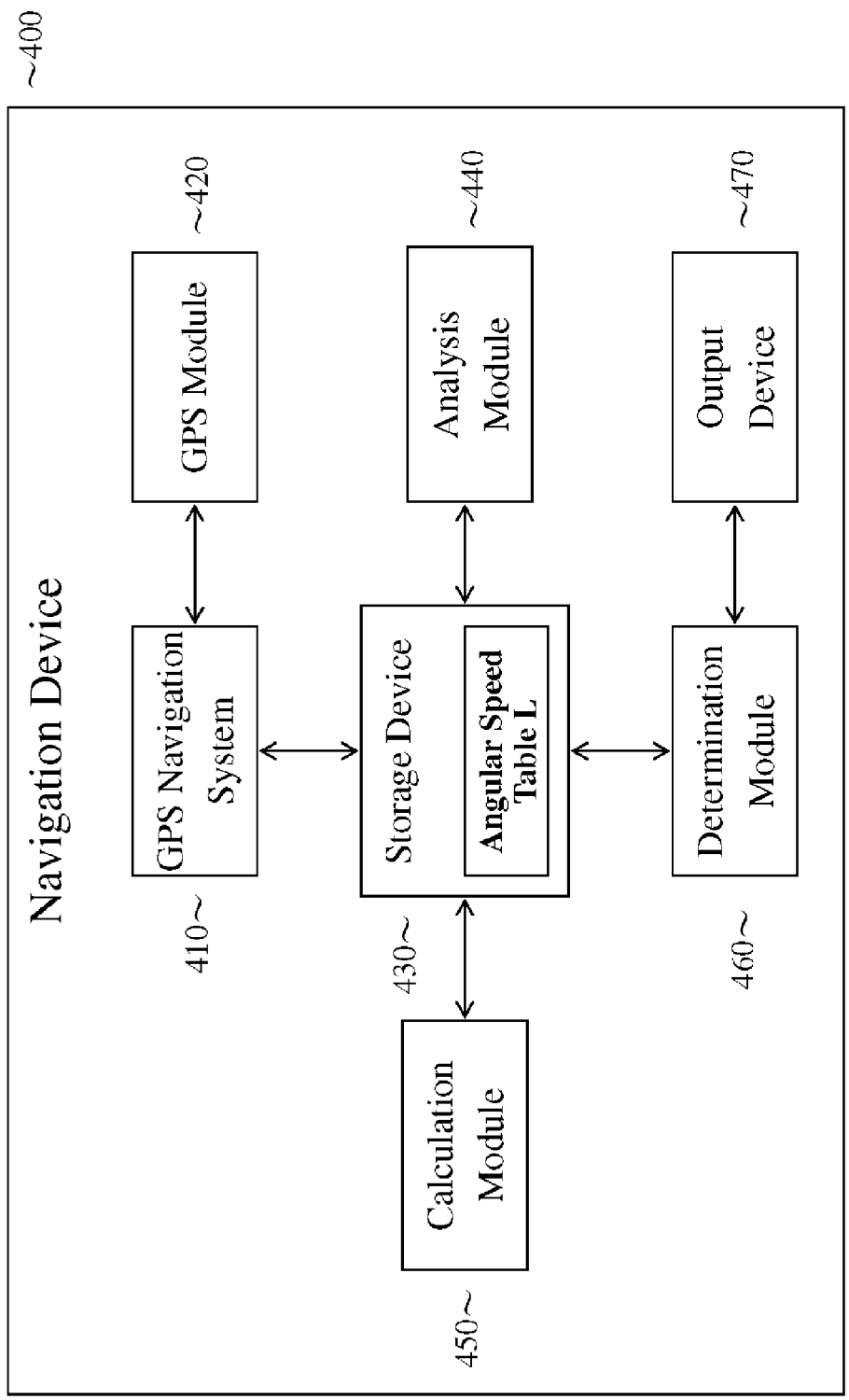
FIG. 4 is a block diagram of one embodiment of a navigation device in accordance with the present disclosure.

FIG. 4 is a block diagram of one embodiment of a navigation device in accordance with the present disclosure.

An embodiment of the navigation device 400 comprises a GPS navigation system 410, a GPS module 420, a storage device 430, an analysis module 440, a calculation module 450, a determination module 460 and an output device 470.

When the navigation device 400 is activated, the GPS navigation system 410 performs an initialization operation to enable the GPS module 420 to perform a positioning operation. The GPS navigation system 410 retrieves multiple GPS data points from the GPS module 420 at fixed time intervals (for example, 1 second) or distance intervals (for example, 100 meters), and stores the retrieved GPS data points in an angular speed table L residing in the storage device 430.

The analysis module 440 analyzes each GPS data point and, when a GPS data point is determined valid based on GPRMC data therein, retrieves a speed over ground $V_k$ and a course over ground $\theta_k$ from the GPS data point. The analysis module 440 stores retrieved speeds over ground $V_k$ and courses over ground $\theta_k$ from each GPS data point in the angular speed table L residing in the storage device 430.

When GPRMC data for N GPS data points have been recorded, the calculation module 450 respectively calculates and stores deflections $\alpha_k$ and average speeds $V_k$ of all GPS data points in the angular speed table L residing in the storage device 430.

The determination module 460 sequentially accesses the deflection $\alpha_k$ and average speed $V_k$ of each GPS data point from the angular speed table L to calculate maximum deflections of each GPS data point, and stores the generated maximum deflections in the angular speed table L residing in the storage device 430. Next, the determination module 460 determines whether a deflection of a GPS data point is greater than its maximum safe deflection and, if so, adds one to a frequency of unsafe driving instances (S=S+1, where S=0 initially). When the determination operations for each GPS data point have been completed, the determination module 460 compares the frequency of unsafe driving instances (S) with a preset threshold value (M, which may be equal to 3 in one embodiment of the present disclosure), and sends out an alarm to the output device 470 as a safety alert.

It should be noted that the output device 470 may be a panel or a speaker of the navigation device 400, while the alarm may be generated images, texts or voice. It should also be noted that the GPS navigation system 410 may be integrated in the GPS module 420.

Advantages of an embodiment of a tracking detection and alarm method of the present disclosure comprises: (1) being able to be implemented by software modules and applied to an existing navigation device without the need for installing extra hardware at additional cost; (2) providing a simple processing algorithm which does not affect system performance and is compatible with an embedded device; and (3) no need for a driver's active cooperation.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A tracking detection and alarm method of a navigation device of a vehicle, the method comprising:
   retrieving a plurality of positioning data points, generated based on locations of the vehicle, from a navigation module of the navigation device;
   calculating and generating a plurality of deflections and a plurality of average speeds that corresponds to the position data points;
   calculating and generating a plurality of maximum deflections according to the average speeds;
   when a deflection of a positioning data point is greater than a maximum deflection thereof, adding one to a frequency of unsafe driving; and
   when the frequency of unsafe driving is greater than a preset threshold value, sending out an unsafe driving alarm.

2. The tracking detection and alarm method as claimed in claim 1, wherein the step of retrieving the positioning data points further retrieves a plurality of speeds over ground and a plurality of courses over ground from the positioning data points for calculating the deflections and the average speeds.

3. The tracking detection and alarm method as claimed in claim 1, wherein the positioning data points are generated with National Marine Electronics Association data format.

4. A track detection and alarm method, applied to a navigation device of a vehicle, the method comprising:
   performing a positioning operation using a navigation module of the navigation device;
   retrieving a first positioning data point and a second positioning data point, generated based on locations of the vehicle, from the navigation module;
   calculating and generating a second deflection and a second average speed of the second position data point;
   calculating and generating a second maximum deflection of the second positioning data point according to the second average speed;
   when the second deflection is greater than the second maximum deflection, adding one to a frequency of unsafe driving; and
   when the frequency of unsafe driving is greater than a preset threshold value, sending out an unsafe driving alarm.

5. The tracking detection and alarm method as claimed in claim 4, further comprising:
   retrieving a first speed over ground from the first positioning data point;
   retrieving a second speed over ground from the second positioning data point; and
   calculating and generating the second average speed according to the first and second speeds over ground.

6. The tracking detection and alarm method as claimed in claim 4, further comprising:
   retrieving a first course over ground from the first positioning data point;
   retrieving a second course over ground from the second positioning data point; and
   calculating and generating the second deflection according to the first and second courses over ground.

7. The tracking detection and alarm method as claimed in claim 4, further comprising, when one of the first and second positioning data points is retrieved, determining whether the retrieved positioning data point is valid according to a positioning status.

8. The tracking detection and alarm method as claimed in claim 4, wherein the second maximum deflection is calculated using the following formula:

$$\alpha = \frac{127 \times (\mu + i) \times 180}{V \times \pi},$$

where $\alpha$ represents the second maximum deflection, $V$ represents the second average speed, $\mu$ represents a lateral force coefficient, i represents a lateral gradient, and π represents a circumference ratio.

9. The tracking detection and alarm method as claimed in claim 4, wherein the second deflection is calculated using the following formula:

$$\alpha_k = \begin{cases} ABS(\theta_k - \theta_{k-1}) & ABS(\theta_k - \theta_{k-1}) < 90 \\ ABS(ABS(\theta_k - \theta_{k-1}) - 360) & ABS(\theta_k - \theta_{k-1}) > 90, \end{cases}$$

where $\alpha_k$ represents the second deflection, ABS represents an absolute value function, $\theta_{k-1}$ and $\theta_k$ respectively represent the first and second courses over ground, and k=1, 2, ..., N.

10. A navigation device, comprising:
a navigation module to generate a plurality of positioning data points and retrieve the positioning data points from the navigation module;
a calculation module to calculate and generate a plurality of deflections and a plurality of average speeds that corresponds to the position data points;
a determination module to calculate and generate a plurality of maximum deflections according to the average speeds, when a deflection of a positioning data point is greater than a maximum deflection thereof, add one to a frequency of unsafe driving, and, when the frequency of unsafe driving is greater than a preset threshold value, send out an unsafe driving alarm; and
an output device to display the unsafe driving alarm.

11. The navigation device as claimed in claim 10, further comprising an analysis module to retrieve a plurality of speeds over ground and a plurality of courses over ground from the positioning data points for calculating the deflections and the average speeds.

12. The navigation device as claimed in claim 10, wherein the positioning data points are generated with National Marine Electronics Association data format.

13. A navigation device, comprising:
a navigation module to perform a positioning operation, generate a first positioning data point and a second positioning data point, and retrieve the first and second positioning data points from the navigation module;
a calculation module to calculate and generate a second deflection and a second average speed of the second position data point;
a determination module to calculate and generate a second maximum deflection of the second positioning data point according to the second average speed, when the second deflection is greater than the maximum second deflection, add one to a frequency of unsafe driving, and, when the frequency of unsafe driving is greater than a preset threshold value, send out an unsafe driving alarm; and
an output device to display the unsafe driving alarm.

14. The navigation device as claimed in claim 13, further comprising an analysis module, wherein:
the analysis module retrieves a first speed over ground from the first positioning data point and a second speed over ground from the second positioning data point; and
the calculation module calculates and generates the second average speed according to the first and second speeds over ground.

15. The navigation device as claimed in claim 13, further comprising an analysis module, wherein:
the analysis module retrieves a first course over ground from the first positioning data point and a second course over ground from the second positioning data point; and
the calculation module calculates and generates the second deflection according to the first and second courses over ground.

16. The navigation device as claimed in claim 13, wherein when one of the first and second positioning data points is retrieved, the navigation module determines whether the retrieved positioning data point is valid according to a positioning status.

17. The navigation device as claimed in claim 13, wherein the determination module calculates the second maximum deflection using the following formula:

$$\alpha = \frac{127 \times (\mu + i) \times 180}{\overline{V} \times \pi},$$

where $\alpha$ represents the second maximum deflection, $\overline{V}$ represents the second average speed, μ represents a lateral force coefficient, i represents a lateral gradient, and π represents a circumference ratio.

18. The navigation device as claimed in claim 13, wherein the determination module calculates the second deflection using the following formula:

$$\alpha_k = \begin{cases} ABS(\theta_k - \theta_{k-1}) & ABS(\theta_k - \theta_{k-1}) < 90 \\ ABS(ABS(\theta_k - \theta_{k-1}) - 360) & ABS(\theta_k - \theta_{k-1}) > 90, \end{cases}$$

where $\alpha_k$ represents the second deflection, ABS represents an absolute value function, $\theta_{k-1}$ and $\theta_k$ respectively represent the first and second courses over ground, and k=1, 2, ..., N.

* * * * *